March 4, 1958 — H. J. SANDBERG — 2,825,227
TRUE ALTITUDE VARIATION METER
Filed April 9, 1954
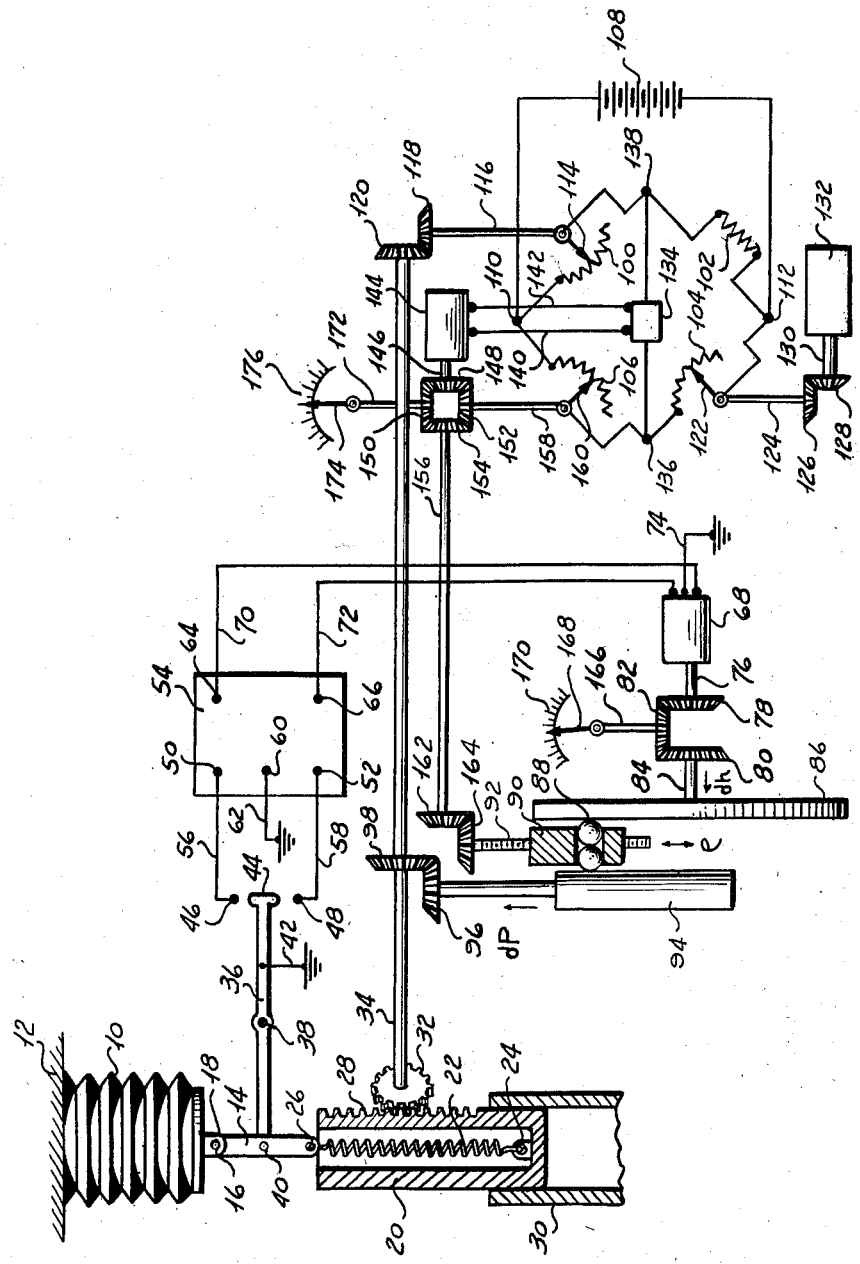
INVENTOR.
HERBERT J. SANDBERG
BY
ATTORNEY United States Patent Office 2,825,227
Patented Mar. 4, 1958

2,825,227

TRUE ALTITUDE VARIATION METER

Herbert J. Sandberg, New York, N. Y., assignor, by mesne assignments, to Norden-Ketay Corporation, a corporation of Illinois Application April 9, 1954, Serial No. 422,180

5 Claims. (Cl. 73—386)

My invention relates to a true altitude variation meter and more particularly to a barometric altimeter which is automatically corrected for errors which would be introduced by actual changes in temperature.

Barometric altimeters of the prior art are arranged to read altitude as a function of barometric pressure. As an airplane rises, the density of the circumambient air, and hence the barometric pressure, decreases as a function of the change in altitude. An altitude-indicating device may, therefore, be calibrated as a function of barometric pressure. However, density of the air is not a simple function of altitude but also varies as the air temperature changes. As a result, the barometric pressure is affected by changes in temperature. Consequently, temperature changes introduce errors into altitude-indicating devices which are calibrated directly in proportion to changes in barometric pressure. In order to correct for such errors, the prior art relied on mechanisms which correct for temperature change in accordance with a pressure-temperature relationship based on a standard atmosphere. Since the actual temperature and actual temperature variation will rarely be the same as the standard atmosphere upon which the pressure-temperature relationship was based, errors will be introduced.

I have invented a true altitude variation meter which automatically corrects for errors which would be introduced by actual changes in temperature. My altimeter gives true altitude readings without the necessity of resorting to a mechanism based on a standard atmosphere. My meter is also arranged to provide air density readings in a manner which will be described more fully hereinafter.

One object of my invention is to provide a true altitude variation meter in which correction is made automatically for errors which would be introduced by actual changes in air temperature.

Another object of my invention is to provide a true altitude variation meter which automatically corrects for variations in density of the atmosphere resulting from actual temperature changes.

A further object of my invention is to provide a true altitude variation meter which always gives true altitude readings without the necessity of resorting to temperature correction mechanism based on a standard atmosphere which would introduce errors.

A still further object of my invention is to provide a true altitude variation meter which is adapted to measure air density.

Other and further objects of my invention will appear from the following description.

In general, my invention contemplates the provision of a device responsive to changes in barometric pressure and means for balancing the pressure exerted by the atmosphere on the pressure responsive device. I provide means responsive to changes in the position of the pressure responsive device for driving the disk of a ball and disk multiplier to actuate the balancing means to return the pressure responsive device to a position of balance. It will be apparent that to achieve such a balance, the output of the ball and disk multiplier must be proportional to changes in barometric pressure.

The balls of my multiplier are positioned by means actuated by the output signal from a Wheatstone bridge which measures the density of the atmosphere. A first ratio arm of my bridge is varied proportionally to changes in barometric pressure by the output of the ball and disk multiplier. The second arm of my bridge is responsive to changes in temperature. The third arm of my bridge is varied in accordance with a function of Mach's number so that the bridge measures the density of the circumambient atmosphere, in a manner which will be described in detail hereinafter. I provide means actuated by a signal proportional to the bridge unbalance for varying the bridge balancing arm in accordance with density to balance the bridge. This means, actuated by a signal proportional to bridge unbalance, is also adapted to position the balls of the ball and disk multiplier.

It is a physical fact that an incremental change in pressure is equal to the density multiplied by a corresponding incremental change in true altitude. Since the output of my multiplier is proportional to changes in pressure and the balls of the multiplier are positioned in accordance with density, the input to the multiplier disk must be proportional to the corresponding change in true altitude. Consequently, the means responsive to changes in position of the pressure responsive device must drive the input shaft of the multiplier in accordance with changes in true altitude. A suitable metering device may be coupled to this input shaft to provide true altitude variation indications. The initial altitude may be set into the device by any convenient means to provide a true altimeter. It will be shown that since one of the arms of my bridge produces an output signal which is proportional to density, the means responsive thereto may drive a density indicating meter.

In the accompanying drawing which forms part of the instant specification and is to be read in conjunction therewith:

The figure is a schematic view of my true altitude variation meter showing the arrangement of parts.

More particularly referring now to the drawings, a bellows 10 or other suitable pressure responsive device is mounted on a fixed support 12 which may be part of a housing, casing or the like. The exterior of the bellows is subjected to the static pressure of the circumambient atmosphere. Conveniently, bellows 10 may be partially evacuated. The bellows 10 is connected to a balancing spring 22 by a link 14 pivoted on a pin 16 carried by an ear 18 formed on the base of the bellows. I connect one end of the spring 22 in a hole 26 in link 14 and the other end to a lug 24 at the bottom of the interior of a hollow rack 20, slidably mounted in a housing 30. Rack 20 has teeth 28 formed on one side thereof and is positioned by a gear 32 which engages teeth 28. Gear 32 is driven by a shaft 34 to position the rack 20 to tension the spring 22 to balance the force exerted by the atmosphere on bellows 10, as will be described in detail hereinafter.

A sensing arm 36, mounted on a fixed pivot 38 and pivotally secured at one end to link 14 by a pin 40, is responsive to the difference between the force resulting from the pressure on bellows 10 and the tension on spring 22. I form the arm 36 of conducting material and ground it at a point along its length by a conductor 42. The free end of arm 36 has a contactor 44 adapted to engage one or the other of a pair of contacts 46 or 48 connected, respectively, to the input terminals 50 and 52 of an amplifier 54 by conductors 56 and 58. A common terminal 60 of the amplifier is connected to ground by a conductor 62. It will readily be appreciated that as contactor 44 engages one or the other of the contacts 46 or 48, amplifier 54 produces an output signal of a polarity corresponding to the direction of movement of arm 36.

I connect the respective output terminals 64 and 66 of amplifier 54 to a motor 68 by conductors 70 and 72 and complete the motor circuit with a ground connection 74. As the contactor 44 of arm 36 engages contact 46 or contact 48, motor 68 rotates in one direction or the other. The output shaft 76 of motor 68 drives gearing 78, 82, 80, which drives the input shaft 84 of a ball and disk multiplier including a disk 86 and balls 88. The balls 88 are carried by a cage 90 which is adapted to be moved radially of the disk 86 in accordance with density, as will be explained hereinafter. The output roller 94 of the multiplier drives the shaft 34 through gears 96, 98, in accordance with changes in pressure to tension spring 22 to balance the force resulting from the pressure exerted by the atmosphere on bellows 10.

As long as the force exerted by the spring 22 is not equal to the force resulting from the pressure of the atmosphere on bellows 10, the contactor 44 of arm 36 continues to engage one of the contacts 46 or 48 of the amplifier 54 and the amplifier continuously produces an output signal. The polarity of this signal is such that motor 68 and, consequently, shaft 34 are driven in one direction or the other until spring 22 exerts a force on bellows 10 which is equal and opposite to the force resulting from the pressure of the atmosphere. The rotation of shaft 34 adjusts the tension on spring 22 by moving the rack member 20 up or down with respect to housing 30.

The direction of rotation of shaft 34 is such that changes in spring tension balance the pressure of the atmosphere on the bellows 10. The position of balls 88 is a function of density. Accordingly, the rotation of the input shaft 84 is such that the amount of rotation of shaft 34 is proportional to changes in pressure. The balls 88 are positioned by means energized from the output signal of a Wheatstone bridge which drives arm 160 to measure density. This bridge includes a first ratio arm 100, a second ratio arm 102, a third arm 104, and a balancing arm 106. A suitable source of electrical energy such as a battery 108 is connected across one pair of terminals 110 and 112 of the bridge. A brush 114, associated with the ratio arm 100, is driven by a shaft 116, connected to the shaft 34 by gearing 118, 120. Brush 114 is thereby positioned to change the resistance of arm 100 in accordance with changes in pressure. Arm 102 is a temperature probe for measuring temperature. A brush 122, associated with the third arm of the bridge, is positioned by a shaft 124, driven by a shaft 130 through gears 126, 128. Shaft 130 is actuated by a Mach number meter 132 of a type well known in the art. For example, a Mach number meter such as is disclosed in the copending application of William C. Coulbourn and Herbert J. Sandberg, Serial No. 335,542, filed February 6, 1953, now Patent No. 2,694,927, dated November 11, 1954, may be employed.

In order to provide a means for balancing my bridge, I connect an amplifier 134 between the terminals 136 and 138. This amplifier produces an output signal which is proportional to the amount of unbalance of the bridge. A pair of conductors 140 and 142 feed this output signal to a motor 144. The shaft 146 of motor 144 has a bevel gear 148 thereon which drives a pair of bevel gears 150 and 152. Gears 150 and 152 engage a gear 154 fixed on one end of a shaft 156. Gear 152 drives a shaft 158 which actuates the brush 160 corresponding to the balancing arm 106 of my bridge.

It can readily be demonstrated that the output of my bridge, which is represented by the amount of rotation of shaft 146, is a measure of density.

Let:

$R_{100}$, $R_{102}$, $R_{104}$, and $R_{106}$ = the respective resistances of bridge arms 100, 102, 104, and 106
$P$ = pressure of air
$T$ = measured temperature of air brought isentropically to rest
$T_0$ = temperature of the free air
$\rho$ = density of the atmosphere
$K = \dfrac{\text{specific heat of air at constant pressure}}{\text{specific heat of air at constant volume}}$
$M = \dfrac{\text{speed of craft}}{\text{velocity of sound in air at } T_0}$ At balance, the relationship of my bridge is:

(1) $$\frac{R_{100}}{R_{102}} = \frac{R_{106}}{R_{104}}$$

I arrange the Mach number measuring meter to produce an output such that the resistance $R_{104}$ is varied in accordance with the relation $(1+0.2KM^2)$. Since I vary the resistance $R_{100}$ in accordance with change in pressure and the temperature responsive resistance $R_{102}$ measures temperature, I may write:

(2) $$\frac{P}{T} = \frac{R_{106}}{1+0.2KM^2}$$

or:

(3) $$R_{106} = P\frac{(1+0.2KM^2)}{T}$$

The relation between free air temperature $T_0$ and the measured temperature $T$, air brought isentropically to rest, is:

(4) $$T_0 = \frac{T}{1+0.2KM^2}$$

Substituting for T in Equation 3, I obtain:

(5) $$R_{106} = \frac{P}{T_0} = C\rho$$

where C is a proportionality constant.

From the foregoing it will be apparent that shaft 146 rotates in accordance with the density of the atmosphere to rotate shaft 158 through gears 148, 152 to drive brush 160 and vary the resistance of arm 106 to balance the bridge. Accordingly, shaft 156 is positioned in accordance with density. Shaft 156 drives the lead screw 92 through bevel gears 162 and 164 to position the cage 90 carrying the balls 88 of the multiplier in accordance with density.

It has been demonstrated that in order to balance the force resulting from the pressure of the atmosphere on the bellows 10, the output roller 94 of the ball and disk multiplier must be driven in accordance with changes in pressure. Since the balls 88 of the multiplier are radially positioned in accordance with density, it follows from the physical relation $dP = \rho dh$ that the input shaft 84 of the multiplier must be rotated in accordance with changes in altitude at balance where $dh$ is a change in altitude and $dP$ is the corresponding change in pressure. A shaft 166, fixed on the bevel gear 82, provides a means for actuating the pointer 168 which cooperates with a scale 170, suitably calibrated to indicate altitude changes. If the scale 170 is to read true altitude values, rather than merely changes in true altitude, the initial altitude may be set into the instrument by any appropriate means.

In order to indicate density, I actuate the pointer 174 associated with a suitably calibrated scale 176 by means of a shaft 172 driven by the gear 150.

In operation, the initial altitude may be set on the scale 170 by any means known to the art, such as a differential or the like. Assuming that the aircraft rises so that the barometric pressure decreases, spring 22 expands bellows 10 and arm 36 pivots about the pivot 38 so that its contactor 44 engages amplifier contact 46. This completes the circuit of the amplifier 54 to produce an output signal for energizing the motor 68 to drive the shaft 76 and rotate disk 86 through gears 78, 82 and 80. This rotation of disk 86 is in a direction to move the rack 20 upwardly to reduce the tension on spring 22 until the force exerted on bellows 10 by the atmosphere is balanced. Rotation of the disk 86 continues until balance is reached since, in the unbalanced condition, a signal is continuously produced by amplifier 54. Since the system automatically comes to balance, the amount of rotation of shaft 34 must be proportional to changes in pressure.

As has been explained hereinbefore, the Wheatstone bridge including arms 100, 102, 104 and 106 measures density. Shaft 156 will, therefore, be positioned by motor 144 in accordance with the density as the aircraft rises to position balls 88 radially along the face of disk 86 as a function of density. Since the output of the multiplier must be proportional to changes in pressure and the balls 88 are positioned according to density, it will readily be seen that the multiplier solves the equation:

(6) $$dP = \rho dh$$

From the above equation, knowing the output of the multiplier, $dP$, and the position of the balls, $\rho$, it is readily apparent that the input to the multiplier, or the amount of rotation of the shaft 76, must be $dh$.

If I originally set the initial altitude into the system, scale 170 can be calibrated to indicate the true altitude value. Since the output of the Wheatstone bridge, represented by the rotation of the shaft 146, is proportional to density, scale 176 indicates density.

If the aircraft descends so that the barometric pressure increases, contactor 44 engages contact 48 and shaft 76 rotates as a function of the decrease in altitude. As before, this indication of a change in altitude is a true indication, since correction for changes in actual temperature is automatically made in the Wheatstone bridge as it measures density.

While I have described my instrument as a meter for measuring absolute altitude, it is primarily intended to function as a true altitude variation meter. In order that the meter read absolute values of altitude, the device must be set to the initial value of altitude.

Thus it will be seen that I have accomplished the objects of my invention. I have provided a true altitude variation meter which is automatically corrected for errors which would be introduced by changes in actual temperature. My meter is adapted also to measure density and corrects the altitude indication for variations in density resulting from temperature changes. My true altitude variation meter eliminates the necessity of resorting to a mechanism which operates in accordance with a pressure-temperature relationship based on a standard atmosphere to obtain an altitude indication. My meter solves the physically correct relationship $dP = \rho dh$ rather than an assumed relationship based on a standard atmosphere.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A true altitude variation meter including in combination a barometric pressure responsive device, sensing means actuated by said pressure responsive device, a multiplier having a pair of input channels and an output channel, means responsive to a change in position of said sensing means for feeding a first one of said input channels, means for producing a signal which is a function of the density of the atmosphere, means energized by a change in said signal for feeding the second of said multiplier input channels, means operated by the output channel of said multiplier for balancing the pressure on said pressure responsive device whereby said means responsive to the position of the sensing means produces a response which is a function of changes in altitude, means operated by said multiplier output channel for feeding the multiplier output to said density signal producing means, and indicating means connected to and actuated by said means responsive to the position of said sensing means.

2. A true altitude variation meter including in combination a barometric pressure responsive device, sensing means connected to said pressure responsive device, a multiplier including a disk, balls and an output roller, said balls being positioned to provide a driving connection between said disk and said output roller, means responsive to a change in position of said sensing means to rotate said disk in a direction corresponding to said change in position, means for producing a signal which is a function of the density of the atmosphere, means responsive to said signal to position the balls of said multiplier an amount representative of the magnitude of the density signal, means operated by said multiplier output roller for balancing the pressure on said pressure responsive device whereby said multiplier disk is rotated in accordance with changes in altitude and indicating means connected to and actuated by said means responsive to the sensing means.

3. A true altitude variation meter as in claim 2 wherein said means for producing said signal is a Wheatstone bridge including three variable resistance arms and a temperature responsive arm, the resistance of a first one of said variable resistance arms being varied by said means operated by the multiplier output shaft, means for varying the resistance of a second one of said variable resistance arms in accordance with a function of Mach's number and means responsive to unbalance of the Wheatstone bridge for producing said signal, said means responsive to said signal varying the resistance of the third one of said variable resistance arms to bring the bridge to balance.

4. A true altitude variation meter including in combination a bellows adapted to expand and contract in response to changes in atmospheric pressure, a spring attached at one end to the bellows, means for tensioning said spring to exert a force to balance the pressure exerted on the bellows by the atmosphere, sensing means connected to said bellows, a multiplier having a pair of input channels and an output channel, means responsive to a change in position of said sensing means for feeding a first one of said input channels, means for producing a signal which is a function of the density of the atmosphere, means energized by a change in said signal for feeding the second of said multiplier input channels, the output channel of said multiplier actuating said spring tensioning means to balance the pressure exerted on said bellows, the arrangement being such that the means responsive to the position of said sensing means produces an output which is proportional to changes in altitude, means operated by said multiplier output channel for feeding the multiplier output to said density signal producing means, and indicating means actuated by said means responsive to the position of the sensing means.

5. A density meter for measuring the density of the atmosphere comprising in combination a Wheatstone bridge having three variable resistance arms and a fourth resistance arm responsive to changes in temperature of the atmosphere, means for varying the resistance of a first of said variable resistance arms in accordance with changes in barometric pressure of the atmosphere, means for varying the resistance of a second of said variable resistance arms in accordance with a function of Mach's number, means responsive to the unbalance of the bridge for producing a signal proportional to the density of the atmosphere, means energized by said signal for varying the resistance of a third of said variable resistance arms to balance the bridge and indicating means actuated by said means energized by said signal.

References Cited in the file of this patent

UNITED STATES PATENTS

| | | |
|---|---|---|
| 2,412,541 | Shivers | Dec. 10, 1946 |
| 2,557,092 | Garbarive | June 19, 1951 |

FOREIGN PATENTS

| | | |
|---|---|---|
| 722,062 | Germany | June 29, 1942 |

OTHER REFERENCES

Zubolz: "Analysis and Design of Translator Chains," vol. I. Askania Regulator Co., Chicago, Illinois, 1946. Pages 209 and 210 relied on.